(12) United States Patent
Krishnapura et al.

(10) Patent No.: US 8,484,642 B2
(45) Date of Patent: Jul. 9, 2013

(54) PROCESSOR CORE SELECTION BASED AT LEAST IN PART UPON AT LEAST ONE INTER-DEPENDENCY

(75) Inventors: Sheshaprasad G. Krishnapura, Mountain View, CA (US); Ty Tang, San Francisco, CA (US); Vipul Lal, Santa Clara, CA (US)

(73) Assignee: Intel Corporation, Santa Clara, CA (US)

( * ) Notice: Subject to any disclaimer, the term of this patent is extended or adjusted under 35 U.S.C. 154(b) by 294 days.

(21) Appl. No.: 12/948,584

(22) Filed: Nov. 17, 2010

(65) Prior Publication Data

US 2012/0124339 A1    May 17, 2012

(51) Int. Cl.
*G06F 9/46* (2006.01)
(52) U.S. Cl.
USPC ............................ 718/100; 718/104; 718/105
(58) Field of Classification Search
USPC .................................. 718/100, 102, 104, 105
See application file for complete search history.

(56) References Cited

U.S. PATENT DOCUMENTS

| | | | | |
|---|---|---|---|---|
| 7,503,039 | B2 * | 3/2009 | Inoue et al. ................... | 717/154 |
| 7,647,476 | B2 * | 1/2010 | Mozak et al. ................. | 712/200 |
| 7,650,488 | B2 * | 1/2010 | Foong et al. .................. | 712/225 |
| 8,151,081 | B2 * | 4/2012 | Harikumar et al. ........... | 711/173 |
| 2007/0038987 | A1 * | 2/2007 | Ohara et al. ................... | 717/151 |
| 2007/0282572 | A1 * | 12/2007 | Larus ............................. | 703/2 |
| 2008/0040458 | A1 * | 2/2008 | Zimmer et al. ............... | 709/220 |
| 2008/0114973 | A1 * | 5/2008 | Norton et al. ................. | 712/228 |
| 2008/0244747 | A1 * | 10/2008 | Gleichauf et al. ............ | 726/25 |
| 2009/0138887 | A1 * | 5/2009 | Uehara et al. ................. | 718/104 |
| 2010/0083259 | A1 * | 4/2010 | Veal et al. ..................... | 718/102 |

OTHER PUBLICATIONS

"Cpuset—Confine processes to processor and memory node subsets", Linux Programmer's Manual, Cpuset (7), dated Nov. 12, 2008, Webpage retrieved from: http://www.kernel.org/doc/man-pages/online/pages/man7/cpuset.7.html.
Dow, Eli "Take charge of processor affinity", developerWorks, Linux, Technical library, Sep. 29, 2005, Webpage retrieved from: http://www.ibm.com/developerworks/linux/library/l-affinity.html.
Kumar, Avinesh "Multiprocessing with the Completely Fair Scheduler", Introducing the CFS for Linux, developerWorks, IBM Corporation, Jan. 8, 2008, 13 pages.
Jones, Tim M., "Inside the Linux 2.6 Completely Fair Scheduler", Providing fair access to CPUs since 2.6.23, developerWorks, IBM Corporation, Dec. 15, 2009, 10 pages.
"Numa—NUMA policy library"—Linux man page, copyright 2002, 2004, Webpage retrieved from: http://linux.die.net/man/3/numa.
Kleen, Andi "An NUMA API for Linux", SUSE Labs, Aug. 2004, pp. 1-12.
"Numactl—Control NUMA policy for processes or shared memory", numactl(8)—Linux man page, copyright 2002, 2004, Webpage retrieved from: http://linux.die.net/man/8/numactl.
Bligh, et al., "Linux on NUMA Systems", Reprinted from the Proceedings of the Linux Symposium, vol. One, Jul. 21-24, 2004, pp. 89-102.
"Taskset—retrieve or set a processes's CPU affinity", taskset(1)—Linux man page, copyright 2004, Webpage retrieved from: http://linux.die.net/man/1/taskset.

* cited by examiner

*Primary Examiner* — Van Nguyen
(74) *Attorney, Agent, or Firm* — Christopher K. Gagne (57) ABSTRACT

An embodiment may include at least one first process to be executed, at least in part, by circuitry. The at least one first process may select, at least in part, from a plurality of processor cores, one or more processor cores to execute, at least in part, at least one second process. The at least one first process may select, at least in part, the one or more processor cores based at least in part upon whether at least one inter-dependency exists, at least in part, between the at least one second process and at least one third process also to be executed by the one or more processor cores. Many alternatives, variations, and modifications are possible.

12 Claims, 4 Drawing Sheets

PROCESSOR CORE SELECTION BASED AT LEAST IN PART UPON AT LEAST ONE INTER-DEPENDENCY

FIELD

This disclosure relates to processor core selection based at least in part upon at least one inter-dependency (e.g., between or among multiple processes).

BACKGROUND

One conventional computer includes central processing units (CPU) coupled to CPU sockets. Each CPU includes respective processor cores. The conventional computer operates in accordance with a non-uniform memory architecture in which memory that can be accessed by a respective core can be classified as either local memory or remote memory with respect to that core, depending upon whether the memory is local to or remote from that core's CPU socket. A local memory access may involve relatively less latency than a remote memory access.

Typically, an operating system in the computer assigns, in accordance with a default scheme, processes to processor cores for execution by the cores. In making these assignments, the operating system makes the assignments of processes to cores based upon current core loading (e.g., a new process is assigned to the core having the least loading). In making these assignments, the operating system has no visibility into, and therefore, does not take into account whether respective processes (1) derive from wholly independent jobs, or (2) are related to each other (e.g., are part of collaborative tasks, utilize common datasets, and/or satisfy parent, child, or sibling relationships). This may result in related processes being assigned to cores of different sockets. This may substantially increase inter-socket communication traffic and remote memory accesses. This may substantially reduce processing and memory access efficiency and performance.

BRIEF DESCRIPTION OF THE SEVERAL VIEWS OF THE DRAWINGS

Features and advantages of embodiments will become apparent as the following Detailed Description proceeds, and upon reference to the Drawings, wherein like numerals depict like parts, and in which.

Although the following Detailed Description will proceed with reference being made to illustrative embodiments, many alternatives, modifications, and variations thereof will be apparent to those skilled in the art. Accordingly, it is intended that the claimed subject matter be viewed broadly.

DETAILED DESCRIPTION

Figure 1:
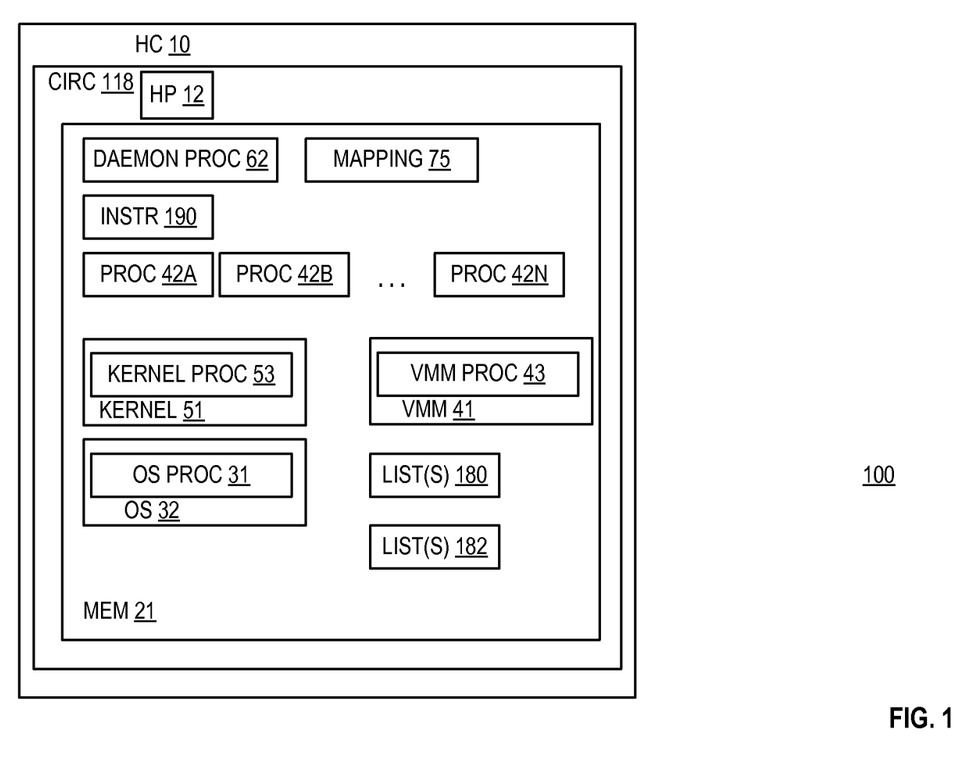
FIG. 1 illustrates a system embodiment.

FIG. 1 illustrates a system embodiment 100. System 100 may include host computer (HC) 10. In this embodiment, the terms "host computer," "host," "server," "client," "network node," and "node" may be used interchangeably, and may mean, for example, without limitation, one or more end stations, mobile internet devices, smart phones, media devices, input/output (I/O) devices, tablet computers, appliances, intermediate stations, network interfaces, clients, servers, and/or portions thereof. In this embodiment, data and information may be used interchangeably, and may be or comprise one or more commands (for example one or more program instructions), and/or one or more such commands may be or comprise data and/or information. Also in this embodiment, an "instruction" may include data and/or one or more commands.

HC 10 may comprise circuitry 118. Circuitry 118 may comprise, at least in part, one or more multi-core host processors (HP) 12 and computer-readable/writable memory 21. Although not shown in the Figures, HC 10 also may comprise one or more chipsets (comprising, e.g., memory and/or input/output controller circuitry). HP 12 may be capable of accessing memory 21.

In this embodiment, "circuitry" may comprise, for example, singly or in any combination, analog circuitry, digital circuitry, hardwired circuitry, programmable circuitry, co-processor circuitry, state machine circuitry, and/or memory that may comprise program instructions that may be executed by programmable circuitry. Also in this embodiment, a processor, CPU, processor core, core, and controller each may comprise respective circuitry capable of performing, at least in part, one or more arithmetic and/or logical operations, and/or of executing, at least in part, one or more instructions. Although not shown in the Figures, HC 10 may comprise a graphical user interface system that may comprise, e.g., a respective keyboard, pointing device, and display system that may permit a human user to input commands to, and monitor the operation of, HC 10 and/or system 100.

Memory 21 may comprise one or more of the following types of memories: semiconductor firmware memory, programmable memory, non-volatile memory, read only memory, electrically programmable memory, random access memory, flash memory, magnetic disk memory, optical disk memory, and/or other or later-developed computer-readable and/or writable memory. One or more machine-readable program instructions 190 may be stored in memory 21. In operation of HC 10, these instructions may be accessed and executed by one or more host processors 12. When executed by one or more host processors 12, these one or more instructions may result in one or more operating systems (OS) 32, one or more virtual machine monitors (VMM) 41, one or more kernels 51, one or more daemon processes 62, and/or one or more processes 42A ... 42N being executed at least in part by one or more host processors 12, and becoming resident at least in part in memory 21. Also when executed by one or more host processors 12, these one or more instructions may result in one or more host processors 12, one or more OS 32, one or more VMM 41, one or more kernels 51, one or more daemon processes 62, one or more processes 42A ... 42N, and/or one or more components thereof, performing operations described herein as being performed by these components of system 100.

In this embodiment, one or more OS 32, VMM 41, kernels 51, one or more processes 42A ... 42N, and/or processes 62 may be mutually distinct from each other, at least in part. Alternatively or additionally, without departing from this embodiment, one or more respective portions of one or more OS 32, VMM 41, kernels 51, one or more processes 42A ... 42N, and/or processes 62 may not be mutually distinct, at least in part, from each other and/or may be comprised, at least in part, in each other. Thus, for example, one or more processes 62 may be comprised, at least in part, in one or more OS 32, VMM 41, and/or kernels 51. In this embodiment, a portion or subset of an entity may comprise all or less than all of the entity. Also, in this embodiment, a process, daemon, program, driver, operating system, application, kernel, and/or VMM each may (1) comprise, at least in part, and/or (2) result, at least in part, in and/or from, execution of one or more operations and/or program instructions.

In this embodiment, one or more OS 32 may be or comprise, at least in part, one or more OS processes 31. One or more VMM 41 may be or comprise, at least in part, one or more VMM processes 43. One or more kernels 51 may be or comprise, at least in part, one or more kernel processes 53.

Figure 2:
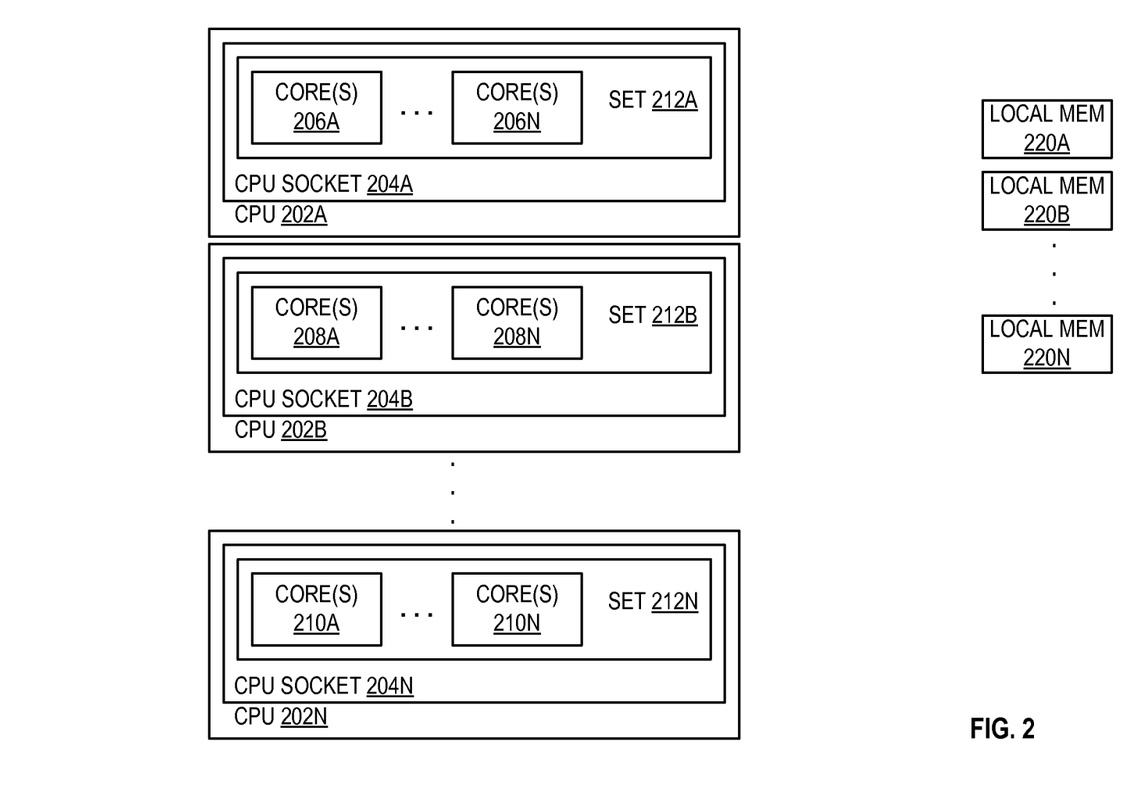
FIG. 2 illustrates features in an embodiment.

Turning to FIG. 2, in this embodiment, one or more HP 12 may comprise, at least in part, a plurality of CPU 202A . . . 202N. CPU 202A . . . 202N may comprise, at least in part, respective CPU sockets 204A . . . 204N and respective associated sets 212A . . . 212N of processor cores.

For example, CPU 202A may comprise and/or be associated, at least in part, with CPU socket 204A. CPU socket 204A may comprise and/or be associated, at least in part, with a processor core set 212A. Processor core set 212A may comprise and/or be associated, at least in part, with processor cores 206A . . . 206N.

Also, for example, CPU 202B may comprise and/or be associated, at least in part, with CPU socket 204B. CPU socket 204B may comprise and/or be associated, at least in part, with a processor core set 212B. Processor core set 212B may comprise and/or be associated, at least in part, with processor cores 208A . . . 208N.

Also, for example, CPU 202N may comprise and/or be associated, at least in part, with CPU socket 204N. CPU socket 204N may comprise and/or be associated, at least in part, with a processor core set 212N. Processor core set 212N may comprise and/or be associated, at least in part, with processor cores 210A . . . 210N.

Thus, in this embodiment, the plurality of processor cores in the sets 212A . . . 212N may be distributed between (or among in this case) the plurality of sockets 204A . . . 204N. The plurality of processor cores may access memory (e.g., memory 21) in accordance, at least in part, with non-uniform memory access (e.g., one or more non-uniform memory access architectures and/or techniques). For example, for each of the CPU sockets 204A . . . 204N and the respective process core sets 212A . . . 212N associated, at least in part, with the respective sockets 204A . . . 204N, memory 21 may comprise, at least in part, respective local memory 220A . . . 220N. For example, in this embodiment, with respect to a respective CPU, its associated CPU socket, and/or its associated processor core set, respective local memory may be or comprise memory that is comprised in, and/or more closely coupled to and/or associated with, the respective CPU, associated CPU socket, and/or processor core set than respective remote memory. Additionally or alternatively, a respective CPU and/or its associated processor core set, may be capable of accessing, at least in part, respective local memory faster (e.g., with reduced latency relative to) than respective remote memory. Further additionally or alternatively, architectures and/or techniques other than and/or in addition to non-uniform memory access architecture and/or techniques may be employed and/or embodied, at least in part, in HC 10 and/or system 100 without departing from this embodiment.

For example, in this embodiment, local memory 220A may be local memory with respect to CPU 202A, socket 204A, and/or processor core set 212A, at least in part. Also for example, in this embodiment, local memory 220B may be local memory with respect to CPU 202B, socket 204B, and/or processor core set 212B, at least in part. Additionally, for example, in this embodiment, local memory 220N may be local memory with respect to CPU 202N, socket 204N, and/or processor core set 212N. In this embodiment, any portion of memory 21 that may not be local memory with respect to a given CPU, its associated socket, and/or its associated processor core set may be considered remote memory with respect to that CPU, its associated socket, and/or its associated processor core set.

After, for example, a reset of system 100 and/or HC 10, a not shown user may issue a request to HC 10 via the not shown graphical user interface that a plurality of processes (e.g., application processes) 42A . . . 42N be executed, at least in part, by one or more HP 12. This may result, at least in part, in one or more OS 32 assigning and/or scheduling, in accordance with a default OS scheme, the processes 42A . . . 42N to be executed by certain processor cores in HP 12. For example, the default OS scheme may specify that processor cores that currently are the least loaded (e.g., in terms of processing bandwidth and/or workload) are to be assigned new processes for execution. Accordingly, one or more OS 32 may assign and/or schedule the processes 42A . . . 42N to be executed by processor cores (e.g., 206A, 208A, and/or 210A) that currently are the least loaded.

In this example, processes 42A . . . 42N may comprise one or more respective sets 312 (see FIG. 3) of processes that exhibit, at least in part, one or more respective inter-dependencies between or among the processes in the one or more sets 312. For example, in this embodiment, one or more sets 312 may comprise one or more processes 42A and one or more processes 42B that may exhibit, at least in part, one or more respective inter-dependencies between processes 42A and 42B. In this embodiment, the one or more inter-dependencies between one or more processes 42A and one or more processes 42B may be or comprise, at least in part, (1) one or more data sets (DS) 302A and/or 302B to be accessed (e.g., during execution of one or more processes 42A and 42B), at least in part, by both one or more processes 42A and one or more processes 42B, (2) one or more jobs 310 that may comprise, at least in part, both one or more processes 42A and one or more processes 42B, and/or (3) one or more inter-process communication dependencies (e.g., the one or more processes 42A and one or more processes 42B may communicate with each other and/or be expected to communicate with each other). For example, processes 42A . . . 42N, during their execution, may be associated with, generate, utilize, and/or access, at least in part, DS 302A . . . 302N. DS 302A and/or 302B may be common, at least in part, to one or more processes 42A and one or more processes 42B. For example, during execution, at least in part, of one or more processes 42A and one or more processes 42B, one or more DS 302A and/or one or more DS 302B may be accessible, at least in part, by both one or more processes 42A and one or more processes 42B. In this embodiment, an access may involve one or more reads and/or one or more writes.

Figure 3:
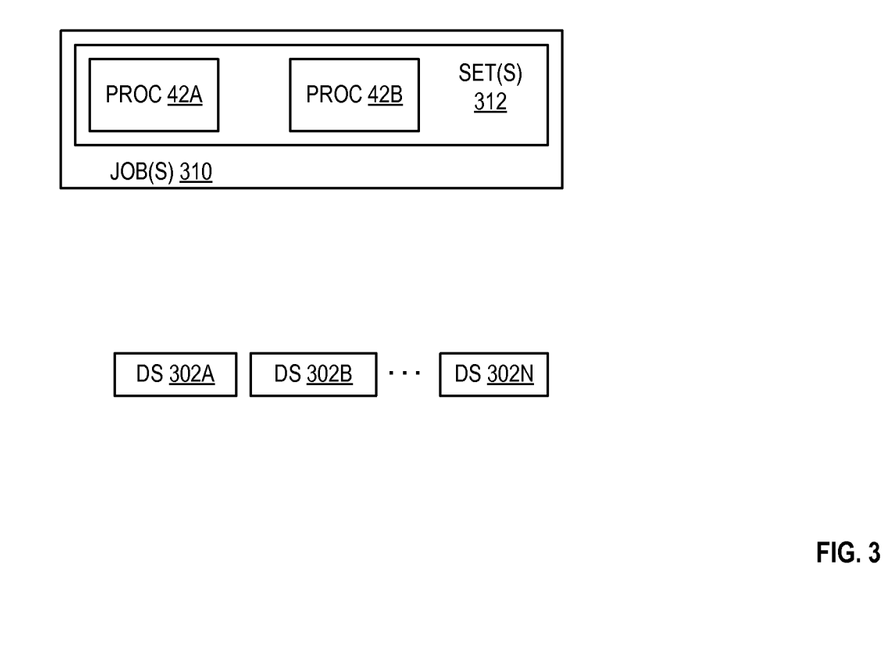
FIG. 3 illustrates features in an embodiment.

Also, in this embodiment, the respective processes 42A and 42B in one or more sets 312 in one or more jobs 310 may be related to each other, at least in part, as one or more parents, children, and/or siblings. For example, one or more processes 42A may be or comprise, at least in part, one or more application processes (e.g., one or more parent processes) submitted by a user, and one or more processes 42B may be or comprise, at least in part, one or more processes spawned by and/or resulting from, at least in part, one or more processes 42A (e.g., as one or more children and/or sibling processes). In this embodiment, a job may be, comprise, and/or result from, at least in part, one or more processes, applications, and/or commands submitted from, requested by, and/or initiated by, at least in part, a user, and/or provided to, at least in part, one or more user initiated and/or controlled processes (e.g., one or more OS, kernel, and/or VMM processes).

As stated previously, one or more OS 32 (e.g., one or more OS processes 31) may initially assign and/or schedule the processes 42A . . . 42N to be executed by processor cores (e.g., 206A, 208A, and/or 210A) that currently are the least loaded. These processor cores 206A, 208A, and/or 210A may be associated, at least in part, with different respective processor core sets 212A, 212B, and 212N that may be associated, at least in part, with different respective CPU sockets 204A, 204B, and 204N. As a result, in accordance with this initial assignment and/or scheduling, at least in part, by one or more OS 32, one or more processes 42A and one or more processes 42B that may exhibit, at least in part, one or more inter-dependencies, may be assigned to be and/or scheduled for execution, at least in part, by respective processor cores 206A and 208A in different respective processor core sets 212A and 212B that are associated, at least in part, with different respective CPU sockets 204A and 204B.

Before, after, and/or contemporaneously, at least in part, with this assignment and/or scheduling, at least in part, by one or more OS 32, one or more daemon processes 62 may select, at least in part, from the plurality of processor cores in the sets 212A . . . 212N, one or more processor cores (e.g., 206A) to execute, at least in part, one or more processes (e.g., 42A). This selection, at least in part, by one or more processes 62 may be based, at least in part, upon whether one or more inter-dependencies may exist between (e.g., may be exhibited by), at least in part, one or more processes 42A and one or more processes (e.g., 42B) that are also to be executed, at least in part, by these one or more processor cores 206A. As a result, at least in part, of this selection, at least in part, by one or more processes 62, one or more processes 42A and one or more processes 42B that may exhibit, at least in part, one or more inter-dependencies may be commonly assigned and/or scheduled, at least in part, for execution, at least in part, by one or more cores 206A that may be associated, at least in part, with a single respective processor core set 212A that may be associated, at least in part, with a single respective CPU socket 204A.

Figure 4:
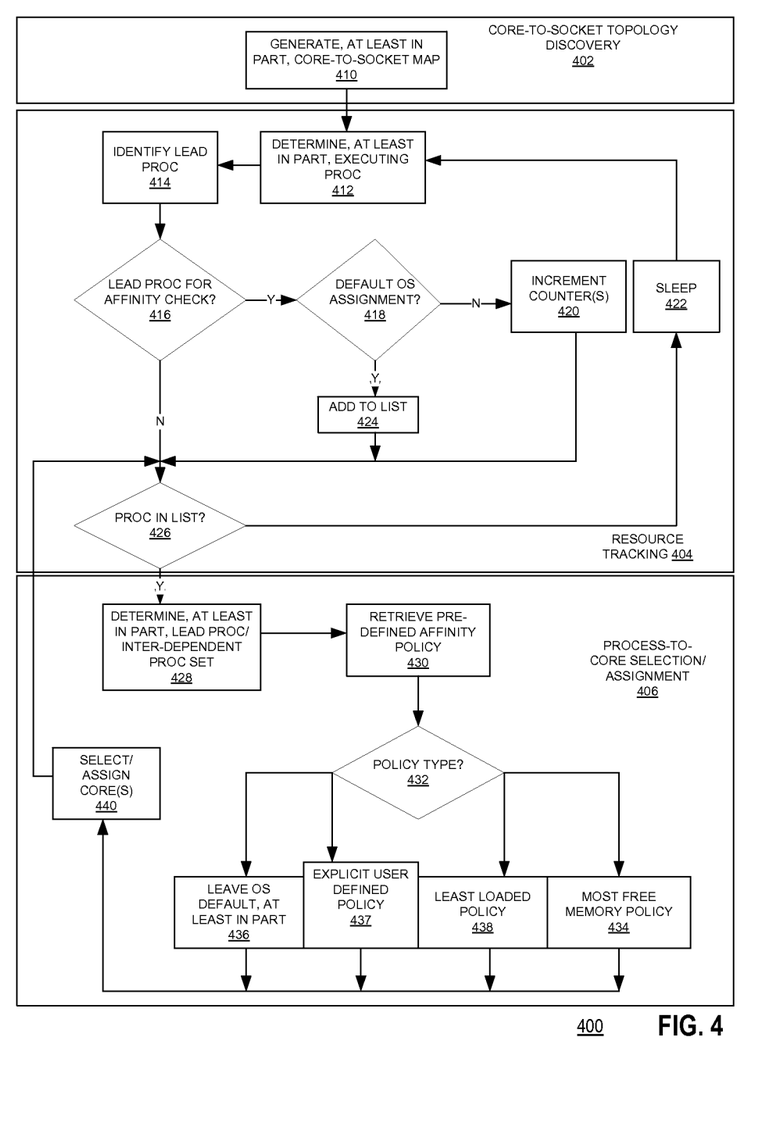
FIG. 4 illustrates operations in an embodiment.

This selection, at least in part, by one or more daemon processes 62 may involve and/or comprise, at least in part, one or more processes 62 performing, at least in part, one or more iterations of one or more (and in this embodiment, a plurality of) operations 400 (see FIG. 4). For example, operations 400 may comprise, at least in part, one or more core/socket discovery operations 402. One or more operations 402 may comprise and/or result in, at least in part, the generation, at least in part, by one or more processes 62 of a mapping of the plurality of processor cores in sets 212A . . . 212N with the CPU cores 206A . . . 206N, 208A . . . 208N, . . . 210A . . . 210N with which they may be associated, at least in part, as illustrated by operation 410. For example, the mapping may correlate, at least in part, the processor cores in the sets 212A . . . 212N with the sets 212A . . . 212N and/or sockets 204A . . . 204N with which the processor cores may be associated, at least in part. In this embodiment, one or more processes 62 may invoke, at least in part, one or more application program interface, OS, kernel, and/or VMM function calls in order in performing operations 402 and/or 410.

One or more processes 62 then may perform, at least in part, one or more resource tracking operations 404. As part of operations 404, one or more processes 62 may determine, at least in part, processes 42A . . . 42N that may currently be active (e.g., executing, assigned to be executed, and/or scheduled for execution by the processor cores in HP 12), as illustrated by operation 412. Thereafter, also as part of operations 404, one or more processes 62 may identify, at least in part, one or more lead (e.g., parent and/or primary) processes (e.g., 42A) of one or more jobs (e.g., 310) that may belong, at least in part, to one or more (e.g., user) predefined lists 180 (see FIG. 1), as illustrated by operation 414. This may involve, for example, one or more searches of one or more process tables for one or more parameters (e.g., key words, names, handles, data sets, and/or characteristics) related, at least in part, to one or more such lead processes. The parameters may have been specified and/or indicated, at least in part, in one or more lists 180 previously generated, at least in part, based at least in part upon user input. These lists 180 also may specify and/or indicate, at least in part, one or more desired CPU socket affinities to be applied, at least in part, to these one or more lead processes and/or one or more processes that may exhibit one or more inter-dependencies with the one or more lead processes. If one or more processes 62 determines, at least in part, that no such lead processes were identified, at least in part, as a result at least in part of one or more operations 414, one or more processes 62 may determine (see operation 416) to execute, at least in part, one or more operations 426. Conversely, if one or more processes 62 identify, at least in part, one or more such lead processes (e.g., 42A), as result at least in part of one or more operations 414, one or more processes 62 may determine (see operation 416) to execute, at least in part, one or more operations 418. In this embodiment, a CPU or CPU socket affinity may involve, specify, imply, identify, and/or indicate, directly or indirectly, at least in part, one or more CPU and/or CPU sockets that may be associated, at least in part, with one or more processor cores that may be assigned and/or scheduled to execute, at least in part, one or more processes.

In executing, at least in part, one or more operations 418, one or more processes 62 may determine, at least in part, whether one or more lead processes 42A have been assigned for execution to one or more processor cores by the one or more OS 32 in accordance with the default OS scheme. If, as a result at least in part of executing, at least in part, one or more operations 418, one or more processes 62 determines, at least in part, that this is the case, one or more processes 62 may add (see one or more operations 424) the one or more lead processes 42A to a list 182 of processes for which one or more processes 62 are to set one or more appropriate CPU socket affinities (e.g., in accordance with one or more lists 180). One or more processes 62 may then execute one or more operations 426.

Conversely, if, as a result at least in part of executing, at least in part, one or more operations 418, one or more processes 62 determines, at least in part, that no such assignment of one or more processes 42A by OS 32 has been made, one or more processes 62 may determine, at least in part, one or more processes 42A have previously been assigned by one or more processes 62 to one or more processor cores for execution (e.g., in accordance with one or more appropriate CPU socket affinities in one or more lists 180). Accordingly, one or more processes 62 may increment one or more counters that may indicate, at least in part, the workload of the one or more processor cores in processor core set associated, at least in part, with the CPU socket whose affinity is specified in the list 180 for the one or more processes 62 (see operation 420). One or more processes 62 then may execute, at least in part, one or more operations 426.

In executing, at least in part, one or more operations 426, one or more processes 62 may determine, at least in part, whether one or more lead processes 42A are indicated, at least in part, in list 182. If, as a result at least in part of executing, at least in part, one or more operations 426, one or more processes 62 determines, at least in part, that no such processes are indicated, at least in part, in list 182, one or more processes 62 may sleep (e.g., wait without further processing) for a predetermined period of time (see operation 422). Thereafter, one or more processes 62 may re-execute, at least in part, operations 404, starting with one or more operations 412.

Conversely, if as a result at least in part of one or more operations 426, one or more processes 62 determines, at least in part, that one or more processes 42A are indicated, at least in part, in list 182, one or more processes 62 may execute, at least in part, one or more process-core selection/assignment operations 406. Operations 406 may result, at least in part, one or more processes 62 determining, at least in part, one or more respective sets (e.g., 312) of processes that may exhibit one or more respective inter-dependencies. Operations 406 also may result, at least in part, in one or more processes 62 assigning these one or more respective sets 312 of processes to one or more respective processor core sets (e.g., 212A) for execution (e.g., by one or more processor cores (e.g., one or more of the cores 206A . . . 206N) comprised in that processor core set 212A.

For example, operations 406 may commence with one or more processes 62 determining, at least in part, one or more lead processes 42A that may be indicated, at least in part, in list 182, and any processes (e.g., one or more processes 42B) that may exhibit one or more inter-dependencies with one or more lead processes 42A, as illustrated by one or more operations 428. One or more processes 42B may be determined, at least in part, by one or more processes 62, based at least in part upon, for example, one or more process table and/or tree searches, utilizing one or more of the above and/or other parameters related, at least in part, to one or more such lead processes 42A. After executing, at least in part, one or more operations 428, one or more processes 62 may retrieve, at least in part, from, for example, one or more lists 180 one or more appropriate CPU socket affinities previously specified, at least in part, for one or more sets 312 of processes that may include one or more lead processes 42A and one or more inter-dependent processes 42B, as illustrated by one or more operations 430. These one or more appropriate CPU socket affinities may reflect, and/or may be specified and/or indicated, at least in part, in accordance with, in terms of, as a result of, and/or based, at least in part upon, one or more (e.g., user) pre-defined CPU socket affinity policies.

For example, the one or more pre-defined CPU socket affinity policies may be or comprise, at least in part, one or more of the following: (1) leaving unchanged, at least in part, at least one present CPU socket affinity that resulted, at least in part, from the default OS assignment/scheduling scheme, (2) applying, at least in part, one or more explicitly user-defined CPU socket affinities, (3) basing, at least in part, at least one CPU socket affinity to be applied, at least in part, upon respective loadings of respective processor core sets, and/or (4) basing, at least in part, at least one CPU socket affinity to be applied, at least in part, upon respective amounts of memory available to respective processor core sets. Accordingly, in this embodiment, one or more processes 62 may determine, at least in part, based at least in part, upon one or more lists 180, which of these pre-defined CPU socket affinity policies upon which should be based, at least in part, assignment of the one or more respective sets 312 of processes to one or more respective processor core sets, as illustrated by one or more operations 432.

If, as a result, at least in part, of one or more operations 432, one or more processes 62, determines, at least in part, that the first such pre-defined CPU socket affinity policy should be applied, at least in part, then one or more processes 62 may assign one or more sets 312 in such a way as to maintain, at least in part, the assignment made by OS 32 in accordance with its default assignment/scheduling scheme, as illustrated by one or more operations 436. In this case, one or more processes 62 may maintain the assignment of one or more processes 42A to one or more cores 206A for execution, but may re-assign one or more processes 42B to one or more of the cores 206A . . . 206N in the same processor core set 212A to which one or more cores 206A may belong (see one or more operations 440). As a result, at least in part, of this, one or more respective sets 312 of processes may be assigned for execution to a respective processor core set (e.g., 212A) that is associated, at least in part, with a single respective CPU socket (e.g., 204A). Alternatively, without departing from this embodiment, in implementing one or more operations 436 and/or 438, one or more processes 62 may wholly maintain the previous processor core assignment made by OS 32 in accordance with the default OS assignment/scheduling scheme.

Conversely, if, as a result, at least in part, of one or more operations 432, one or more processes 62, determines, at least in part, that the second such pre-defined CPU socket affinity policy should be applied, at least in part, then one or more processes 62 may assign one or more sets 312 in such a way as to apply the one or more explicitly user-defined CPU socket affinities, as illustrated by one or more operations 437. By way of example, if these one or more explicitly user-defined CPU socket affinities indicate, at least in part, that one or more sets 312A are to be assigned to a single respective processor core set 212N, then one or more processes 62 may re-assign for execution both one or more processes 42A and one or more processes 42B to one or more of the cores 210A . . . 210N in the single respective processor core set 212N (see one or more operations 440). As a result, at least in part, of this, one or more respective sets 312 of processes may be assigned for execution to a single respective processor core set 212N that is associated, at least in part, with a single respective CPU socket 204N.

Conversely, if, as a result, at least in part, of one or more operations 432, one or more processes 62, determines, at least in part, that the third such pre-defined CPU socket affinity policy should be applied, at least in part, then one or more processes 62 may assign one or more sets 312 to the currently least loaded (e.g., in terms of processing bandwidth loading and/or workload) processor core set, as illustrated by one or more operations 438. In this embodiment, the currently least loaded processor core set may be determined, at least in part, by which of the one or more respective counters utilized, at least in part, for example, in one or more operations 420, may be currently set to the lowest respective value. By way of example, if the counter that has the lowest value is associated with processor core set 212A, then one or more processes 62 may assign for execution both one or more processes 42A and one or more processes 42B to one or more of the cores 206A . . . 206N in the single respective processor core set 212A (see one or more operations 440). As a result, at least in part, of this, one or more respective sets 312 of processes may be assigned for execution to a single respective processor core set 212A that is associated, at least in part, with a single respective CPU socket 204A.

Conversely, if, as a result, at least in part, of one or more operations 432, one or more processes 62, determines, at least in part, that the fourth such pre-defined CPU socket affinity policy should be applied, at least in part, then one or more processes 62 may assign one or more sets 312 to the respective processor core set that is associated, at least in part, with the most currently available memory (e.g., the greatest amount of local memory that is currently unused), as illustrated by one or more operations 434. In this embodiment, one or more processes 62 may determine, at least in part, the respective amounts of local memories 220A . . . 220N that may be currently unused, based at least in part upon, for example, one or more OS, VMM, and/or kernel commands and/or files. By way of example, if local memory 220B currently has the greatest amount of unused memory, then one or more processes 62 may assign for execution both one or more processes 42A and one or more processes 42B to one or more of the cores 208A . . . 208N in the single respective processor core set 212B (see one or more operations 440). As a result, at least in part, of this, one or more respective sets 312 of processes may be assigned for execution to a single respective processor core set 212B that is associated, at least in part, with a single respective CPU socket 204B.

After executing, at least in part, one or more operations 440, one or more processes 62 may execute one or more operations 426. In this embodiment, operations 404 and/or 406 may be performed, at least in part by one or more processes 62 in one or more respective iterations at one or more respective periodic intervals (e.g., 60 second intervals). These intervals may be dynamically configurable by, for example, the user.

Thus, an embodiment may include at least one first process to be executed, at least in part, by circuitry. The at least one first process may select, at least in part, from a plurality of processor cores, one or more processor cores to execute, at least in part, at least one second process. The at least one first process may select, at least in part, the one or more processor cores based at least in part upon whether at least one inter-dependency exists, at least in part, between the at least one second process and at least one third process also to be executed by the one or more processor cores.

Thus, in this embodiment, one or more processes 62 may the assign one or more sets 312 of processes that may exhibit one or more inter-dependencies to one or more processor cores belonging to the same respective CPU socket. This may localize memory accesses (e.g., to the CPU socket's local memory) by the processes in the one or more sets 312 in such a way as to permit communication traffic between or among the CPU sockets and/or remote memory accesses to be significantly reduced. This may permit improve processing and memory access efficiency and performance in this embodiment. Also, advantageously, the assignment of the one or more sets 312 of processes to the one or more processor cores in this embodiment may be substantially automated, without user's explicit knowledge of the currently executing processes, workload information, and/or affinity information, and/or without detailed manual input of commands being provided by the user.

Many modifications are possible. Accordingly, this embodiment should be viewed broadly as encompassing all such alternatives, modifications, and alternatives.

What is claimed is:

1. An apparatus comprising:
at least one first process to be executed, at least in part, by circuitry, the at least one first process to select, at least in part, from a plurality of processor cores, one or more processor cores to execute, at least in part, at least one second process, the at least one first process to select, at least in part, the one or more processor cores based at least in part upon whether at least one inter-dependency exists, at least in part, between the at least one second process and at least one third process also to be executed by the one or more processor cores, the at least one first process to assign, at least in part, the at least one second process to the one or more processor cores after at least one operating system process has assigned, at least in part, the at least one second process to at least one processor core in the plurality of processor cores;
wherein:
the plurality of processor cores comprise a plurality of processor core sets, each respective processor core set including one or more respective processor cores and being associated with a single respective central processing unit socket;
the at least one first process is to determine, at least in part, one or more respective sets of processes that exhibit one or more respective inter-dependencies;
the at least one first process is to assign the one or more respective sets of processes that exhibit the one or more respective inter-dependencies to one or more respective processor core sets for execution;
the at least one first process is to assign the one or more respective sets of processes to the one or more respective processor core sets after the at least one operating system process has assigned, at least in part, the one or more respective sets of processes to the at least one processor core in the plurality of processor cores; and
assignment by the at least one first process of the one or more respective sets of processes to the one or more respective processor core sets is based, at least in part, upon one or more of:
respective loadings of the respective processor core sets;
respective amounts of memory available to respective processor core sets; and
one or more central processing unit socket affinities to be applied, at least in part, to the one or more respective sets of processes.

2. The apparatus of claim 1, wherein:
the at least one inter-dependency comprises at least one of:
at least one data set to be accessed, at least in part, by both the at least one second process and the at least one third process; and
at least one job that comprises, at least in part, both the at least one second process and the at least one third process.

3. The apparatus of claim 1, wherein:
the circuitry comprises, at least in part, the plurality of processor cores;
the plurality of processor cores are associated with central processing unit sockets; and
the at least one first process is to generate, at least in part, a mapping of the plurality of processor cores to associated sockets.

4. The apparatus of claim 1, wherein:
the plurality of processor cores are distributed between two or more central processing unit sockets;
the plurality of processor cores access memory in accordance, at least in part, with non-uniform memory access; and
the at least one first process is comprised, at least in part, in at least one of:
an operating system;
a virtual machine monitor; and
a kernel.

5. A method comprising:
executing, at least in part, by circuitry, at least one first process to select, at least in part, from a plurality of processor cores, one or more processor cores to execute, at least in part, at least one second process, the at least one first process to select, at least in part, the one or more processor cores based at least in part upon whether at least one inter-dependency exists, at least in part, between the at least one second process and at least one third process also to be executed by the one or more processor cores, the at least one first process to assign, at least in part, the at least one second process to the one or more processor cores after at least one operating system process has assigned, at least in part, the least one second process to at least one processor core in the plurality of processor cores;
wherein:
the plurality of processor cores comprise a plurality of processor core sets, each respective processor core set including one or more respective processor cores and being associated with a single respective central processing unit socket;
the at least one first process is to determine, at least in part, one or more respective sets of processes that exhibit one or more respective inter-dependencies;
the at least one first process is to assign the one or more respective sets of processes that exhibit the one or more respective inter-dependencies to one or more respective processor core sets for execution;
the at least one first process is to assign the one or more respective sets of processes to the one or more respective processor core sets after the at least one operating system process has assigned, at least in part, the one or more respective sets of processes to the at least one processor core in the plurality of processor cores; and assignment by the at least one first process of the one or more respective sets of processes to the one or more respective processor core sets is based, at least in part, upon one or more of:
- respective loadings of the respective processor core sets;
- respective amounts of memory available to respective processor core sets; and
- one or more central processing unit socket affinities to be applied, at least in part, to the one or more respective sets of processes.

6. The method of claim 5, wherein:
the at least one inter-dependency comprises at least one of:
- at least one data set to be accessed, at least in part, by both the at least one second process and the at least one third process; and
- at least one job that comprises, at least in part, both the at least one second process and the at least one third process.

7. The method of claim 5, wherein:
the circuitry comprises, at least in part, the plurality of processor cores;
the plurality of processor cores are associated with central processing unit sockets; and
the at least one first process is to generate, at least in part, a mapping of the plurality of processor cores to associated sockets.

8. The method of claim 5, wherein:
the plurality of processor cores are distributed between two or more central processing unit sockets;
the plurality of processor cores access memory in accordance, at least in part, with non-uniform memory access; and
the at least one first process is comprised, at least in part, in at least one of:
- an operating system;
- a virtual machine monitor; and
- a kernel.

9. Computer-readable memory storing one or more instructions that when executed by a machine result in performance of operations comprising:
executing, at least in part, by circuitry, at least one first process to select, at least in part, from a plurality of processor cores, one or more processor cores to execute, at least in part, at least one second process, the at least one first process to select, at least in part, the one or more processor cores based at least in part upon whether at least one inter-dependency exists, at least in part, between the at least one second process and at least one third process also to be executed by the one or more processor cores, the at least one first process to assign, at least in part, the at least one second process to the one or more processor cores after at least one operating system process has assigned, at least in part, the least one second process to at least one processor core in the plurality of processor cores;
wherein:
the plurality of processor cores comprise a plurality of processor core sets, each respective processor core set including one or more respective processor cores and being associated with a single respective central processing unit socket;
the at least one first process is to determine, at least in part, one or more respective sets of processes that exhibit one or more respective inter-dependencies;
the at least one first process is to assign the one or more respective sets of processes that exhibit the one or more respective inter-dependencies to one or more respective processor core sets for execution;
the at least one first process is to assign the one or more respective sets of processes to the one or more respective processor core sets after the at least one operating system process has assigned, at least in part, the one or more respective sets of processes to the at least one processor core in the plurality of processor cores; and
assignment by the at least one first process of the one or more respective sets of processes to the one or more respective processor core sets is based, at least in part, upon one or more of:
- respective loadings of the respective processor core sets;
- respective amounts of memory available to respective processor core sets; and
- one or more central processing unit socket affinities to be applied, at least in part, to the one or more respective sets of processes.

10. The computer-readable memory of claim 9, wherein:
the at least one inter-dependency comprises at least one of:
- at least one data set to be accessed, at least in part, by both the at least one second process and the at least one third process; and
- at least one job that comprises, at least in part, both the at least one second process and the at least one third process.

11. The computer-readable memory of claim 9, wherein:
the circuitry comprises, at least in part, the plurality of processor cores;
the plurality of processor cores are associated with central processing unit sockets; and
the at least one first process is to generate, at least in part, a mapping of the plurality of processor cores to associated sockets.

12. The computer-readable memory of claim 9, wherein:
the plurality of processor cores are distributed between two or more central processing unit sockets;
the plurality of processor cores access memory in accordance, at least in part, with non-uniform memory access; and
the at least one first process is comprised, at least in part, in at least one of:
- an operating system;
- a virtual machine monitor; and
- a kernel.

* * * * *